United States Patent
Fang et al.

(10) Patent No.: US 8,990,952 B2
(45) Date of Patent: Mar. 24, 2015

(54) LICENSING PLATFORM

(71) Applicant: Quanta Computer Inc., Tao Yuan Shien (TW)

(72) Inventors: Tien-Chin Fang, Taoyuan County (TW); Chen-Chung Lee, Nantou County (TW); Ping-Chi Lai, Taoyuan County (TW); Chia-Hung Lin, New Taipei (TW); Ming-Jen Chen, New Taipei (TW); Hung-Yu Yang, Changhua County (TW)

(73) Assignee: Quanta Computer Inc., Tao Yuan Shien (TW)

( * ) Notice: Subject to any disclaimer, the term of this patent is extended or adjusted under 35 U.S.C. 154(b) by 3 days.

(21) Appl. No.: 13/970,968

(22) Filed: Aug. 20, 2013

(65) Prior Publication Data

US 2014/0366150 A1    Dec. 11, 2014

(30) Foreign Application Priority Data

Jun. 6, 2013    (TW) .............................. 102120115 A (51) Int. Cl.
*G06F 7/04*    (2006.01)
*H04L 29/06*    (2006.01)

(52) U.S. Cl.
CPC .................................... *H04L 63/101* (2013.01)
USPC ................. 726/26; 709/223; 705/28

(58) Field of Classification Search
CPC ....... G06F 21/60; G06F 21/10; G06F 21/105; G06F 21/62
See application file for complete search history.

(56) References Cited

U.S. PATENT DOCUMENTS

| | | | | |
|---|---|---|---|---|
| 7,139,737 | B2* | 11/2006 | Takahashi et al. | 705/59 |
| 2007/0299845 | A1* | 12/2007 | Tokunaga | 707/9 |
| 2008/0103977 | A1* | 5/2008 | Khosravy et al. | 705/59 |
| 2009/0055835 | A1* | 2/2009 | Zhu | 718/105 |
| 2009/0124375 | A1* | 5/2009 | Patel | 463/29 |
| 2009/0222926 | A1* | 9/2009 | Pavan et al. | 726/26 |
| 2011/0202433 | A1* | 8/2011 | Yokoyama | 705/28 |
| 2012/0303778 | A1* | 11/2012 | Ahiska et al. | 709/223 |
| 2013/0239232 | A1* | 9/2013 | Yoakum et al. | 726/29 |

* cited by examiner

*Primary Examiner* — Fikremariam A Yalew
(74) *Attorney, Agent, or Firm* — Rabin & Berdo, P.C.

(57) ABSTRACT

A licensing platform is provided. The licensing platform, in communication with a first license sharing device and a second license sharing device, includes a license database and a main license sharing device. The license database provides a plurality of licenses. The main license sharing device includes: a license allocation manager, in communication with the license database, for dynamically managing a usage status of the plurality of licenses; a next-tier membership manager, in communication with the license sharing devices, for allocating at least one of the plurality of licenses to the license sharing devices, and updating a license usage status of the license sharing devices; and a license record manager, in communication with the license allocation manager and the next-tier membership manager, for recording the usage status of the plurality of licenses.

11 Claims, 10 Drawing Sheets

FIG. 13C

LICENSING PLATFORM

This application claims the benefit of Taiwan application Serial No. 102120115, filed Jun. 6, 2013, the subject matter of which is incorporated herein by reference.

BACKGROUND OF THE INVENTION

1. Field of the Invention

The invention relates in general to a licensing platform, and more particularly to a licensing platform for managing software licenses.

2. Description of the Related Art

Accompanied with the thriving Internet, floating licensing that allows sharing of software among multiple computers also becomes prevalent. Floating licensing is a software licensing method that permits computers or work stations to transfer a software license to one another. With such licensing means, a usage period of a software license can be shared by the computers or work stations, with a total number of the computers or work stations using the software license not exceeding a total number software. To manage the number of software licenses being shared by computers or work stations, a licensing platform is usually used for managing transfer of software licenses and verifying software license.

In a conventional software license management method, only a small number of licensed devices are allowed to share software licenses. If the number of software licenses and licensed devices are both increased, not only complications in license management may multiply, but also efficiency of a license platform may be degraded as the licensing platform is prone to be overloaded. Therefore, there is a need for a more efficient licensing platform to solve the above issues.

SUMMARY OF THE INVENTION

According to an aspect of the present invention, a licensing platform is provided. The licensing platform includes a license database and a main license sharing device. The license database provides a plurality of software licenses. The main license sharing device includes: a license allocation manager, in communication with the license database, for dynamically managing a usage status of the software licenses; a next-tier membership manager, in communication with the license sharing devices, for allocating at least one of the software licenses to the license sharing devices, and updating a license usage status of the license sharing devices; and a license record manager, in communication with the license allocation manager and the next-tier membership manager, for recording the usage status of the software licenses.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
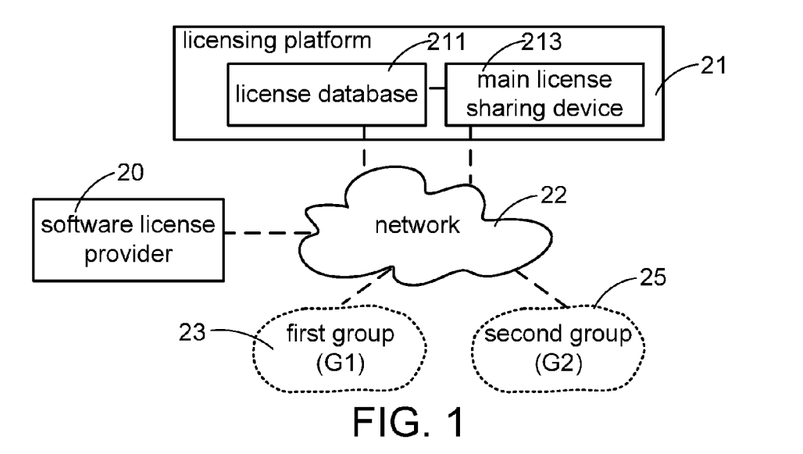
FIG. 1 is a schematic diagram of a licensing system dividing licensed devices into groups.

A license sharing function provided by the present invention is based on allocation management. FIG. 1 shows a schematic diagram of a licensing system classifying licensed devices into groups according to the present invention. The licensing system of the present invention includes a licensing platform 21, and a plurality of licensed devices (not shown). The licensing platform 21 is in communication with the plurality of licensed devices and a software license provider 20 via a network 22. According to different department in a company, the licensed devices may be grouped into licensed devices of a first group (G1) 23, and licensed devices of a second group (G2) 25.

The licensing platform 21 includes a license database 211 and a main license sharing device 213. The license database 211, storing software licenses obtained from the software license provider 20, provides the software licenses to the main license sharing device 213. The main license sharing device 213 then allocates the software licenses to the plurality of licensed devices. Further, the main license sharing device 213 dynamically manages the software licenses.

To enhance dynamic management efficiency of the software licenses, the main license sharing device 213 updates a license usage status corresponding to the plurality of licensed devices, and records a usage status of the software licenses. The plurality of licensed devices may be license sharing devices and/or license usage devices. In simple, a difference between the license sharing device and the license usage device is whether the device has a capability of sharing an software license. The license sharing device has a license management function, and is capable of further allocating the software licenses to a licensed device of a next tier. On the other hand, the license usage device only requests and returns the use of an software license. Both of the license sharing device and the license usage device may provide operations and registrations of one or multiple users. As such, according to requirements of user operations and registrations, one license sharing device or one license usage device may occupy one or more software licenses.

As previously stated, the license sharing device has the license management function. Therefore, another licensed device (a license sharing device and/or a license usage device) that obtains an software license from a license sharing device is defined as a next-tier licensed device of the license sharing device. Details of tiers and groups of license sharing devices are to be described shortly.

Figure 2:
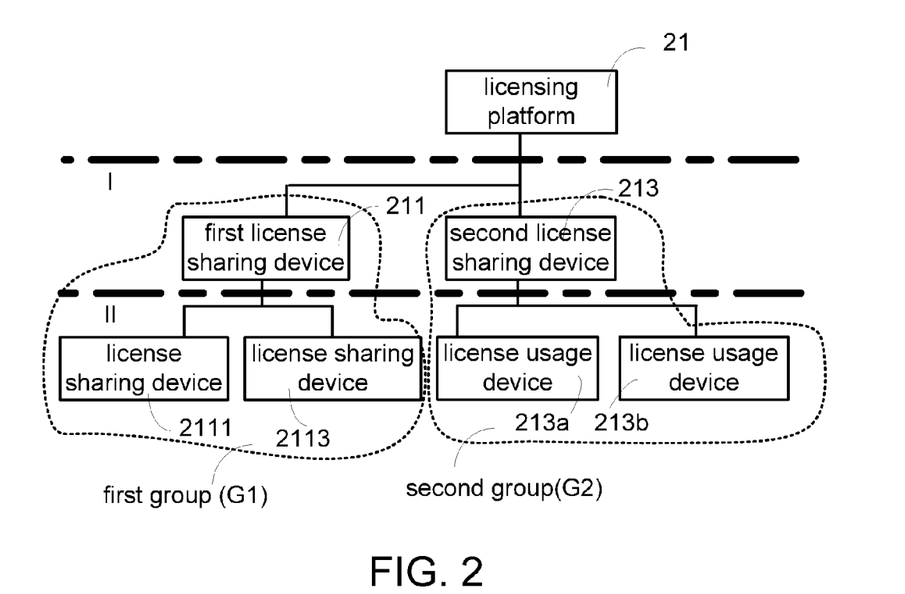
FIG. 2 is a schematic diagram of grouping method and tiers of license sharing devices.

FIG. 2 shows a schematic diagram of a grouping method and tiers of license sharing devices. A first license sharing device 211 and a second license sharing device 213 in communication with the licensing platform 21 are defined as tier-one (I) licensed devices. Licensed devices with license access through the tier-one licensed devices are defined as tier-two (II) licensed devices.

In simple, a licenser is a previous tier of a licensee. Therefore, for the tier-one licensed devices, the licensing platform 21 is a previous tier. On the contrary, a licensee is defined as a next tier of a licenser.

Referring to FIG. 2, two tier-two license sharing devices 2111 and 2113 are in communication with at the next tier of the first license sharing device 211; two licensed user devices 213a and 213b are in communication with at the next tier of the second license sharing device 213.

Referring to FIG. 2, the first license sharing device 211 and the second license sharing device 213 are both tier-one license sharing devices. The licensed devices associated with the next tier of the two licensed devices are defined as a same group. Thus, the first license sharing device 211, and the license sharing devices 2111 and 2113 are defined as the first group G1; the second license sharing device 213, and the license usage devices 213a and 213b are defined as the second group G2.

Details of how license sharing devices share software licenses are described below. In one embodiment, a license sharing device may receive a license borrowing request raised by a next-tier license sharing device, and may also raise a license borrowing request to a next-tier license sharing device. That is, a license sharing device may serve as a medium of a license borrowing request for a next-tier license sharing device. Assuming that the number of software licenses required by the first license sharing device 211 is greater than the number of software licenses assigned to the first license sharing device 211, the license sharing device 2111 first raises a license borrowing request to the first license sharing device 211.

The first license sharing device 211 first determines whether it can lend the software license from itself. If not, the first license sharing device 211 then determines whether the license sharing device 2113 can lend the license. When the license sharing device 2113 possesses a lendable software license, the first license sharing device 211 lends the software license provided from the license sharing device 2113 to the license sharing device 2111 to use.

If the license sharing device 2113 cannot lend the license, the first license sharing device 211 sends a license borrowing request to the licensing platform 21. Through the licensing platform 21, the license borrowing request is passed to the second license sharing device 213. At this point, the second license sharing device 213 determines whether a lendable software license is available in the corresponding second group G2. If so, the second license sharing device 213 provides the lendable software license, and passes the lendable software license through the licensing platform 21 to the first license sharing device 211. Meanwhile, the licensing platform 21 records a transfer status of the software license. When a new license request later arises from the group of the second license sharing device 213, the second license sharing device 213 retrieves the usage right of the software license via the licensing platform 21. It should be noted that, the next-tier licensed devices of the license sharing devices 2111 and 2113 may also be in communication with various kinds of licensed devices (license sharing devices and/or license usage devices). Similarly, the license sharing devices 2111 and 2113 and their next-tier licensed devices may also be regarded as smaller groups.

According to a concept of the present invention, apart from raising a license borrowing request from and lending a software license to a previous-tier license sharing device, the license sharing device may also provide at least an software license to a next-tier licensed device. The next-tier licensed device may be a license sharing device or a license usage device. The software licenses assigned to the next-tier license sharing device may be further passed on to a next-tier licensed device of the next-tier license sharing device when the next-tier licensed device is another license sharing device, and so forth.

When the first license sharing device 211 raises the license borrowing request to the licensing platform 21, the licensing platform 21, in response to an actual internal usage status of the software licenses, dynamically determines how to reply the first license sharing device 211.

To better illustrate internal architectures of the licensing platform and license sharing devices, in an example below, it is also assumed that the licensing system includes the licensing platform, the first license sharing device and the second license sharing device.

Figure 3:
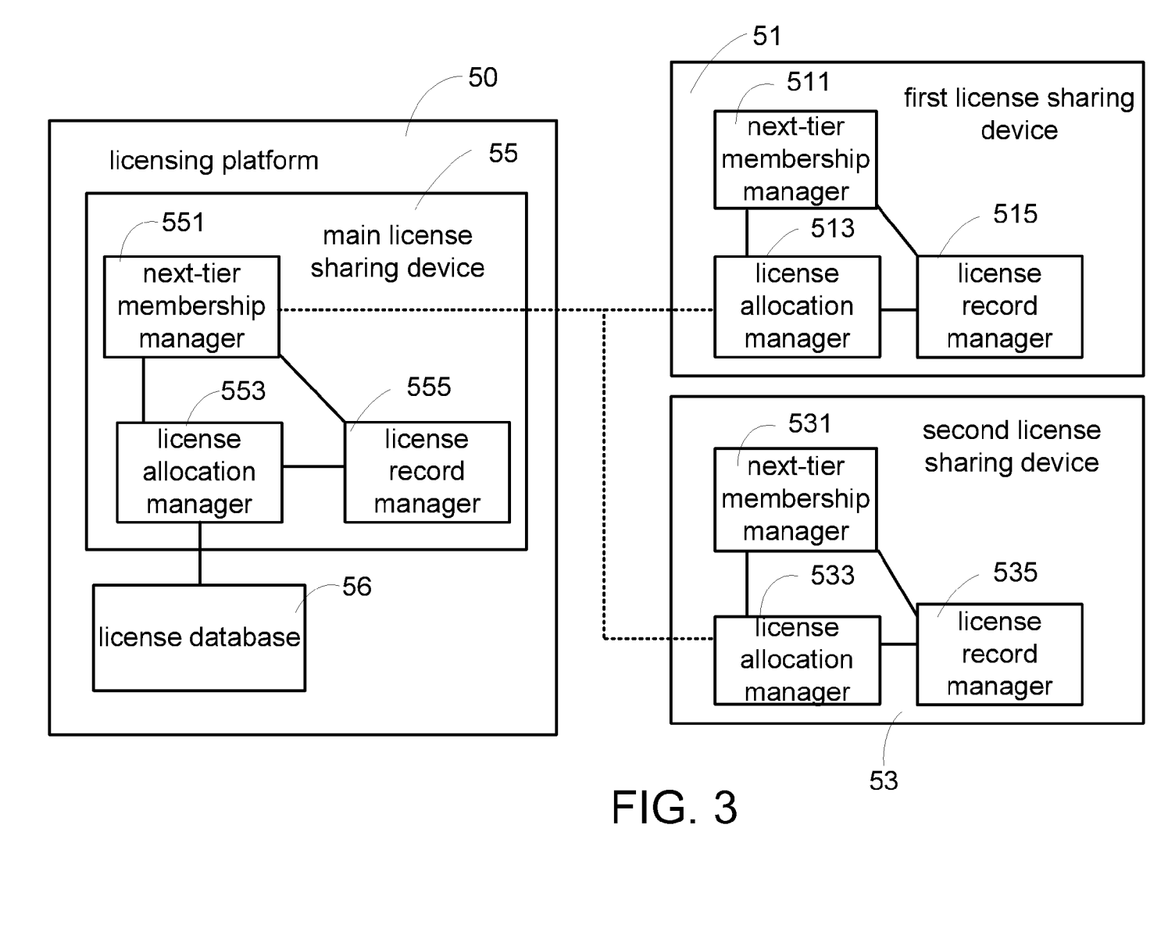
FIG. 3 is a schematic diagram of an internal architecture of a licensing platform and license sharing devices.

FIG. 3 shows a schematic diagram of the internal architectures of the licensing platform and license sharing devices. In FIG. 3, a licensing platform 50 includes the main license sharing device 55 and the license database 56. The main license sharing device 55 has a similar structure as those of the first and the second license sharing devices 51 53. That is, the main license sharing device 55 includes a license allocation manager 553, a next-tier membership manager 551 and a license record manager 555. The first license sharing device 51 includes a license allocation manager 513, a next-tier membership manager 511 and a license record manager 515. The second license sharing device 53 includes a license allocation manager 533, a next-tier membership manager 531 and a license record manager 535. As previous described, a license sharing device supports a function of license sharing with a previous tier and a next tier licensed devices. In practice, the license sharing function is in principle achieved by a license allocation manager and a next-tier membership manager. As such, the license sharing devices of different tiers form a mutually iterative relationship of license sharing.

As seen from FIG. 3, the first license sharing device 51 and the second license sharing device 53, via respective license allocation managers 513 and 533, are in communication with the next-tier membership manager 551 of the main license sharing device 55. After respectively obtaining a plurality of licenses from the main license sharing device 55, the license allocation managers 513 and 533 dynamically manage the allocated and obtained software licenses. The next-tier membership manager 551 of the main license sharing device 55 provides the software licenses to a next-tier licensed device. Further, the next-tier membership manager 551 of the main license sharing device 55 updates an actual license usage status of the first license sharing device 51 and the second license sharing device 53.

The license record managers 555, 515 and 535 of the main license sharing device 55, the first license sharing device 51 and the second license sharing device 53 are respectively in communication with their corresponding next-tier membership managers 551, 511 and 531. A main purpose of the license record managers 555, 515 and 535 is to record a license usage status in respective license sharing devices 55, 51, and 53. For example, the license record managers 555, 515 and 535 record contents such as whether the software license is utilized, the software license is utilized by which user, a usage period of the software license, whether the software license is lent, and whether borrowed license is obtained by a previous-tier or a next-tier license sharing device.

In practice, the license record managers of the license sharing devices in the licensing system may jointly modify a joint license record. Therefore, the transfer of the software licenses between the license sharing devices is equivalent to the licensing platform modifying the license record file of with respect to the number of software licenses corresponding to the license sharing devices. For example, assume that the first license sharing device 51 obtains 10 licenses through the licensing platform 50 from the second license sharing device 53. In the license record file, the licensing platform 50 adds the number of software licenses corresponding to the first license sharing device 51 by 10, and the licensing platform 50 subtracts the number of software licenses corresponding to the second license sharing device 53 by 10.

On the basis of the architecture in FIG. 3, three possible responses generated by the licensing platform 50 after the first license sharing device 51 raises a license borrowing request are described below. License allocation in the licensing system is also described with hypothetical numbers of software licenses.

Figure 4:
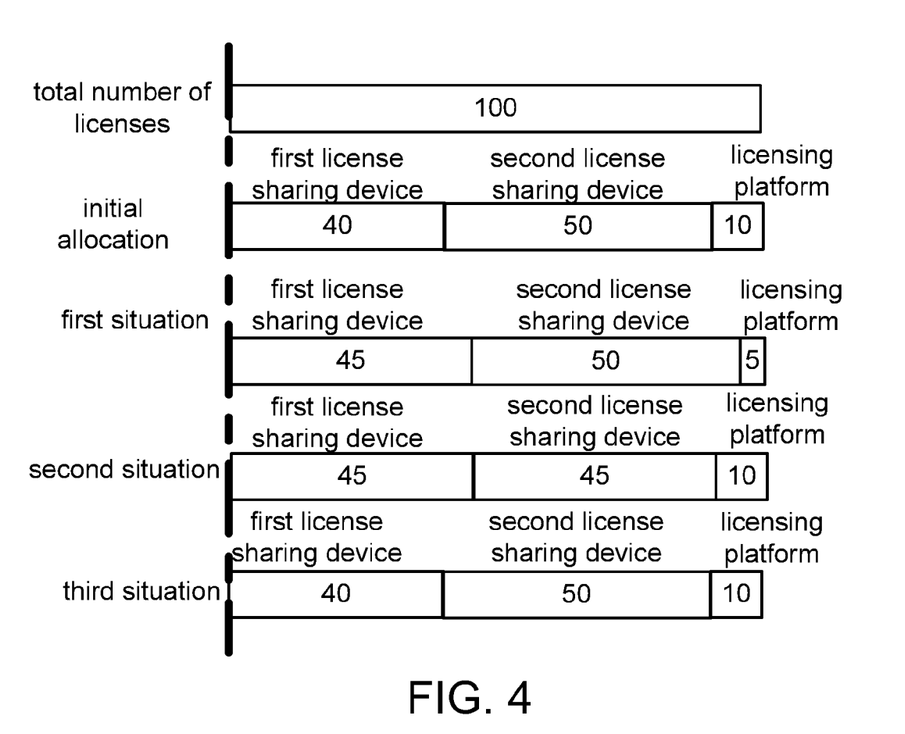
FIG. 4 is a diagram of an application using hypothetical numbers of software licenses.

FIG. 4 shows a diagram of an application using hypothetical numbers of software licenses together with the architecture in FIG. 3. It is assumed that the number of software licenses originally obtained by the licensing platform is 100. Assuming that in an allocation phase of the software licenses, 40, 50 and 10 software licenses are respectively assigned to the first license sharing device 51, the second license sharing device 53 and the licensing platform 50. In FIG. 4, the first row represents the total number of software licenses allocated to the entire licensing system. The second row of FIG. 4 represents the numbers of software licenses that the licensing system initially allocates to the first license sharing device 51, the second license sharing device 53 and the licensing platform 50. According to predetermined requirements of separate groups, these software licenses are allocated respectively. From left to right of the second row in FIG. 4, it is depicted that the first license sharing device 51, the second license sharing device 53 and the licensing platform 50 respectively correspond to 40, 50 and 10 software licenses.

For illustration purposes, it is assumed that the first license sharing device 51 raises a license borrowing request for 5 software licenses. When the first license sharing device 51 raises the license borrowing request to the licensing platform 50, the licensing platform 50 dynamically responds to the first license sharing device 51 according to an internal license usage status of the system. At this point, there are three possible situations as described below.

The third row of FIG. 4 shows a first situation when the first license sharing device 51 raises the license borrowing request. In the first situation, the licensing platform 50 itself has a sufficient number of available software licenses, and so the licensing platform 50 provides software licenses to the first license sharing device 51 at this point. For example, it is assumed that three licensed devices directly in communication with the licensing platform 50 are utilizing the software. That is, 3 software licenses are occupied. Since the licensing platform 50 is allocated with 10 software licenses, the licensing platform 50 at this point has 7 available software licenses. As the first license sharing device 51 requires only 5 software licenses, the licensing platform 50 is capable of directly providing 5 of the available software licenses to the first license sharing device 51.

The fourth row of FIG. 4 shows a second situation when the first license sharing device 51 raises the license borrowing request. In the second situation, the licensing platform 50 does not have any available licenses, whereas the second license sharing device 53 has inactive software licenses. After confirming that the licensing platform 50 itself has no inactive software licenses, the licensing platform 50 searches whether other license sharing devices within the platform have inactive software licenses.

Assume that 10 software licenses at the licensing platform 50 are all in use when the first license sharing device 51 raises a license borrowing request for 5 additional licenses. At this point, the licensing platform 50 determines whether the second license sharing device 53 holds available licenses. Assuming that the second license sharing device 53 still has 20 software licenses that are not in use, the second license sharing device 53, through the licensing platform 50, shares the inactive software licenses to the first license sharing device 51.

The fifth row of FIG. 4 shows a third situation when the first license sharing device 51 raises the license borrowing request. In the third situation, when the first license sharing device 51 raises the license borrowing request of 5 additional licenses, neither the licensing platform 50 nor the second license sharing device 53 has available licenses. At this point, it means that the number of software licenses for the software that the licensing platform 50 obtained or procured from the software license provider is insufficient. Therefore, the licensing platform 50 records such occurrence of insufficient licenses for reference of subsequent software license procurement.

When the first license sharing device 51 cannot immediately obtain software licenses from the licensing platform 50, the licensing platform 50 may suspend the license borrowing request sent from the first license sharing device 51. That is, once the licensed device in communication with the second license sharing device 53 or to the licensing platform 50 releases an software license previously in use, the licensing platform 50 allocates the released software license to the first license sharing device 51 with priority. Alternatively, the licensing platform 50 and the software license provider may reach an agreement that the software license provider will temporarily provide 5 extra software licenses to the licensing platform 50. For example, the software license provider further provides and charges the extra 5 software licenses of the temporary demand.

Figure 5A:
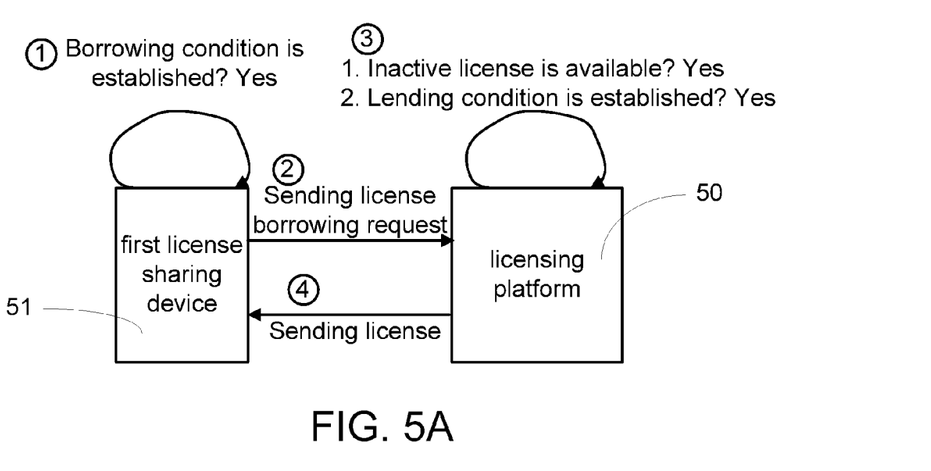
FIG. 5A is a schematic diagram of a first possible response generated by a licensing platform.
Figure 5B:
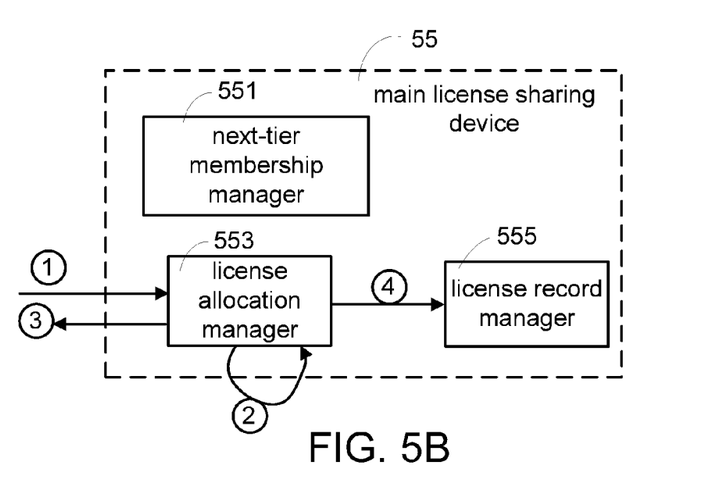
FIG. 5B is a schematic diagram of a main license sharing device in a licensing platform directly providing software licenses.
Figure 6A:
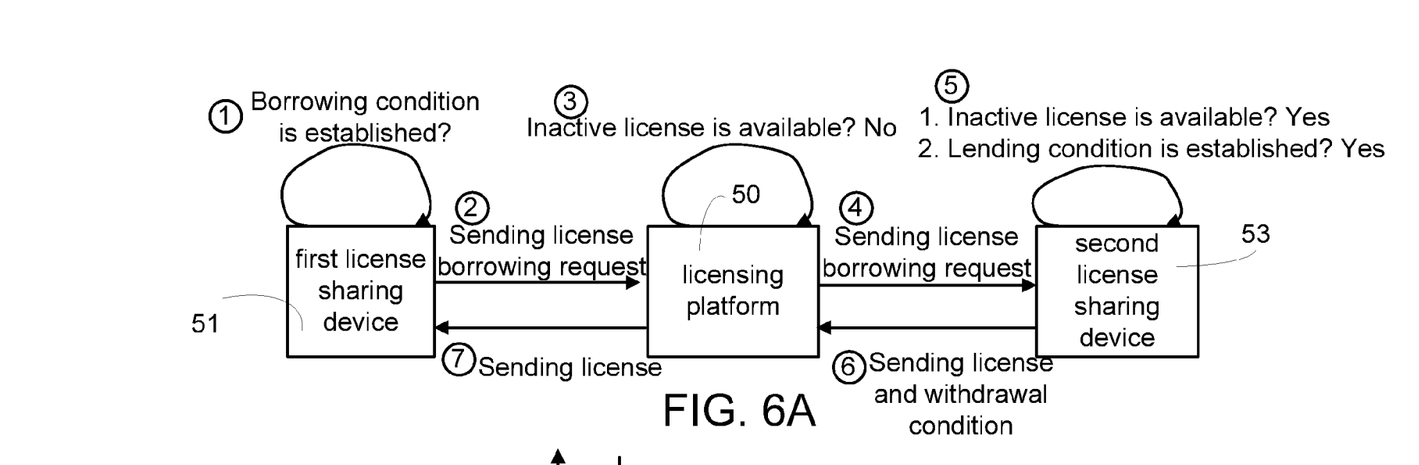
FIG. 6A is a schematic diagram of a second possible response generated by a licensing platform.
Figure 6B:
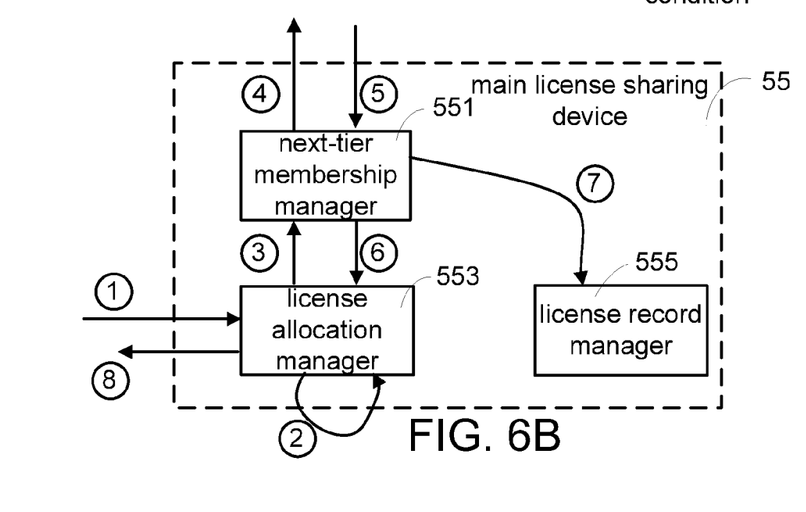
FIG. 6B is a schematic diagram of the main license sharing device in the licensing platform providing the software license from the second license sharing device in response to the license borrowing request raised by the first license sharing device.
Figure 7A:
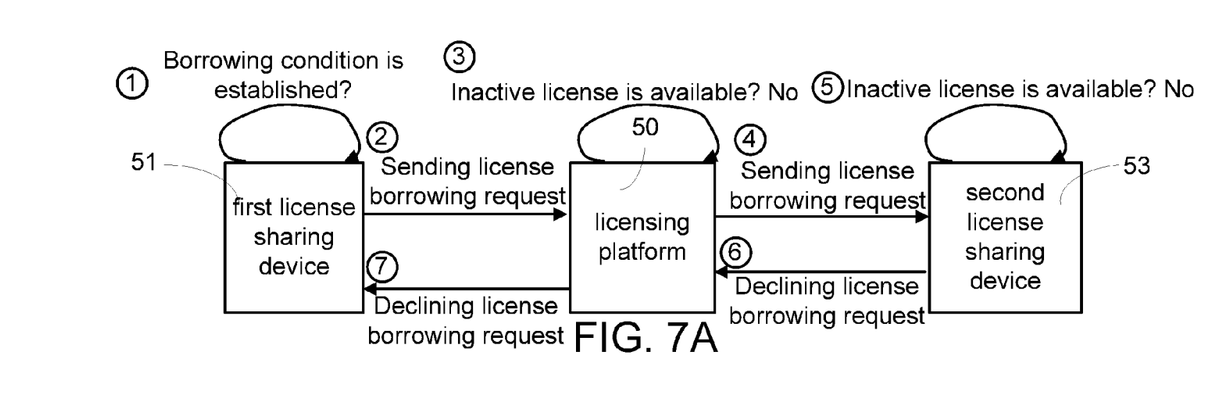
FIG. 7A is a schematic diagram of the third possible response generated by a licensing platform.
Figure 7B:
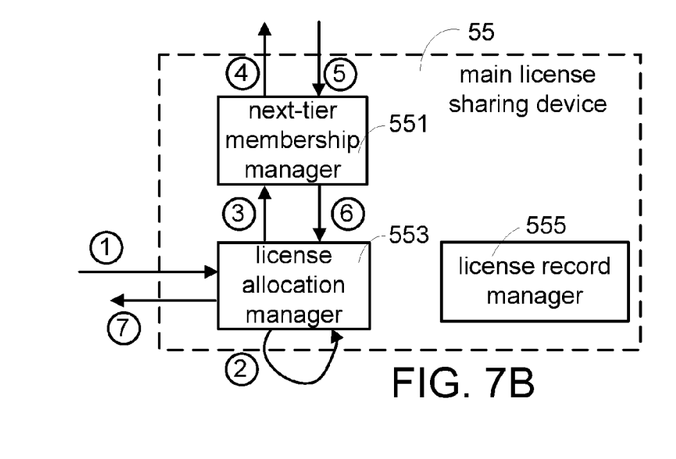
FIG. 7B is a schematic diagram of the main license sharing device in the licensing platform and the second license sharing device being unable to lend software licenses.

FIGS. 5A, 5B, 6A, 6B, 7A and 7B show details of the licensing system 50 dynamically allocating licenses according to different groups. In FIGS. 5A and 5B, the licensing platform directly provides its inactive software licenses to the first license sharing device 51 to use. In FIGS. 6A, 6B, 7A and 7B, the licensing platform 50 does not have any inactive software license, and thus passes a license borrowing request to the second license sharing device 53. A main difference of FIGS. 6A and 6B from FIGS. 7A and 7B is that, the second license sharing device in the former is able to lend software licenses, and the second license sharing device in the latter does not have enough lendable software licenses.

FIGS. 5A and 5B represent the first situation described in the third row of FIG. 4. That is, in response to the license borrowing request raised by the first license sharing device 51, the licensing platform 50 directly provides its inactive software licenses to the first license sharing device 51 to use. FIG. 5A illustrates interactions of the devices in the licensing system. FIG. 5B illustrates detailed operations of the main license sharing device 55.

Referring to FIG. 5A, the schematic diagram shows the first possible response that the main license sharing device in the licensing platform reacts to the license borrowing request raised by the first license sharing device. Number 1: the first license sharing device 51 determines that a license borrowing condition is established. Number 2: the first license sharing device 51 sends a license borrowing request to the licensing platform 50 when the license borrowing condition is established. Number 3: after receiving the license borrowing request raised by the first license sharing device 51, the licensing platform 50 first determines whether an inactive software license is available. If so, it means that a license lending condition of the licensing platform 50 is established. It is assumed here that the determination result is affirmative. Number 4: the licensing platform 50 sends the software license(s) to the first license sharing device 51, which may then utilize the borrowed license. Further, when the licensing platform 50 later meets a withdrawal condition, the licensing platform 50 may request the first license sharing device 51 to return the previously borrowed licenses. Similarly, the first license sharing device 51 sends the license through the licensing platform 50 when later returning the previously borrowed licenses.

As seen from FIG. 5A, when a license sharing device receives a license borrowing request sent from a next-tier license sharing device, the license sharing device prioritizes its inactive software licenses to the next-tier license sharing device. A control process in the main license sharing device 55 in FIG. 5A is further illustrated in FIG. 5B. FIG. 5B is a schematic diagram illustrating the main license sharing device 55 in the licensing platform directly provides its software licenses in response to the license borrowing request raised by the first license sharing device 51. Number 1: the license allocation manager 553 receives the license borrowing request raised by the first license sharing device 51. Number 2: the license allocation manager 553 determines whether a software license is available(inactive). Number 3: the license allocation manager 553 confirms the software license is available (inactive), and accordingly lends its inactive software license to the first license sharing device 51. Number 4: the license allocation manager 553 informs the license record manager 555 about lending the license to the first sharing device 51, and the license record manager updates an internal usage record.

FIGS. 6A and 6B represent the second situation described in the fourth row of FIG. 4. That is, in response to the license borrowing request raised by the first license sharing device 51, the licensing platform 50 passes the license borrowing request to the second license sharing device 53 as the licensing platform 50 itself does not have any inactive software licenses. It is assumed here that the second license sharing device 53 has a lendable software license. FIG. 6A illustrates interactions of the devices in the licensing system. FIG. 6B illustrates detailed operations of the main license sharing device 55.

FIG. 6A is a schematic diagram illustrating the second possible response that the main license sharing device in the licensing platform reacts to the license borrowing request raised by the first license sharing device. Number 1: the first license sharing device 51 determines that the license borrowing condition is established. Number 2: the first license sharing device 51 sends the license borrowing request to the licensing platform 50 when the license borrowing condition is established. Number 3: the licensing platform 50 first determines whether the software license is available (inactive) after receiving the license borrowing request raised from the first license sharing device 51. It is assumed there that the determination result is negative. Number 4: the licensing platform 50 passes the license borrowing request to the second license sharing device 53. Number 5: the second license sharing device 53 determines whether the software license (inactive) is available within the group of the second license sharing device 53, and the second license sharing device 53 determines whether a license lending condition is established. This step covers the license management of the second license sharing device 53 and its next-tier licensed devices. Number 6: the second license sharing device 53 sends an software license for lending and a future license withdrawal condition to the licensing platform 50. Number 7: the licensing platform 50 sends the software license lent by the second license sharing device 53 to the first license sharing device 51. Further, the licensing platform 50 records the future license withdrawal condition provided by the second license sharing device 53.

A control process in the main license sharing device in FIG. 6A is further illustrated in FIG. 6B. FIG. 6B is a schematic diagram illustrating the main license sharing device in the licensing platform providing the software license from the second license sharing device in response to the license borrowing request raised by the first license sharing device. Number 1: the license allocation manager 553 in the main license sharing device 55 receives the license borrowing request raised by the first license sharing device 51. Number 2: the license allocation manager 553 of the main license sharing device 55 determines whether it has an inactive software license. Number 3: the license allocation manager 553 of the main license sharing device 55 determines that it has no inactive software licenses, and thus raises a license borrowing request to the next-tier membership manager 551 of the main license sharing device 55. Number 4: the next-tier membership manager 551 of the main license sharing device 55 inquires the second license sharing device 53 whether the second license sharing device 53 can lend the inactive software license. Number 5: the next-tier membership manager 551 of the main license sharing device 55 obtains the available license from the second license sharing device 53. Number 6: the next-tier membership manager 551 of the main license sharing device 55 informs the license allocation manager 553 of the main license sharing device 55 a successful result of borrowing an software license. Number 7: the next-tier membership manager 551 of the main license sharing device 55 notifies the license record manager 555 of the main license sharing device 55 that the inactive software license originally in the second license sharing device 53 is to be lent. Number 8: the license allocation manager 553 of the main license sharing device 55 passes the software license lent by the second license sharing device 53 to the first license sharing device 51.

As from FIGS. 6A and 6B, when the main license sharing device 55 receives a license borrowing request from a next-tier license sharing device (e.g., the first license sharing device 51) and its own licenses are not available, the main license sharing device 55 will pass the license borrowing request to another next-tier license sharing device (e.g., the second license sharing device 53).

FIGS. 7A and 7B represent the third situation described in the fifth row of FIG. 4. That is, in response to the license borrowing request raised by the first license sharing device 51, the licensing platform 50 further passes the license borrowing request to the second license sharing device 53 as the licensing platform 50 does not have inactive software licenses. Further, it is assumed here that the second license sharing device 53 does not have any lendable license. FIG. 7A illustrates interactions of the devices in the licensing system; FIG. 7B illustrates detailed operations of the main license sharing device 55.

Referring to FIG. 7A, the schematic diagram shows a third possible response that the main license sharing device in the licensing platform reacts to a license borrowing request raised by the first license sharing device. Number 1: the first license sharing device 51 determines that the license borrowing condition is established. Number 2: the first license sharing device 51 sends the license borrowing request to the licensing platform 50 when the license borrowing condition is established. Number 3: the licensing platform 50 determines whether an inactive software license is available after receiving the license borrowing request raised by the first license sharing device 51. It is assumed that the determination result of the licensing platform 50 is negative. Number 4: the licensing platform 50 passes the license borrowing request to the second license sharing device 53. Number 5: the second license sharing device 53 determines whether an inactive software license is available within the group of the second license sharing device 53. It is assumed that the determination result is negative. Number 6: the second license sharing device 53 informs the licensing platform 50 of a result of declining the license borrowing request. Number 7: the licensing platform 50 notifies the first license sharing device 51 that the licensing platform 50 is unable to provide any inactive software license for the first license sharing device 51.

A control process in the main license sharing device in FIG. 7A is further illustrated in FIG. 7B. FIG. 7B is a schematic diagram illustrating the main license sharing device in the licensing platform raising a license borrowing request, with however neither the licensing platform 50 nor the second license sharing device being capable of providing idel licenses in response to the license borrowing request raised by the first license sharing device 51. Number 1: the license allocation manager 553 of the main license sharing device 55 receives the license borrowing request raised by the first license sharing device 51. The main license sharing device 55 determines whether it has an software inactive software license. Number 3: the license allocation manager 553 of the main license sharing device 55 determines that the main license sharing device 55 does not have an inactive software license, and thus raises the license borrowing request to the next-tier membership manager 551. Number 4: the next-tier membership manager 551 of the main license sharing device 55 inquires the second license sharing device 53 for an available license. Number 5: the second license sharing device 53 replies a message of no software license is available to the next-tier membership manager 551 of the main license sharing device 55. Number 6: the next-tier membership manager 551 of the main license sharing device 55 replies the message of no available license to the license allocation manager 553 of the main license sharing device 55. Number 7: the license allocation manager 553 of the main license sharing device 55 sends the message of no available license to the first license sharing device 51 that raised the license borrowing request.

Accordingly, regardless of to which licensed device in which tier available licenses belong, the licensing system is capable of fully exercising these available licenses. Therefore, the licensing system of the present invention manages software licenses with greater flexibilities and thus enhances the usage efficiency of the software licenses.

Figure 8:
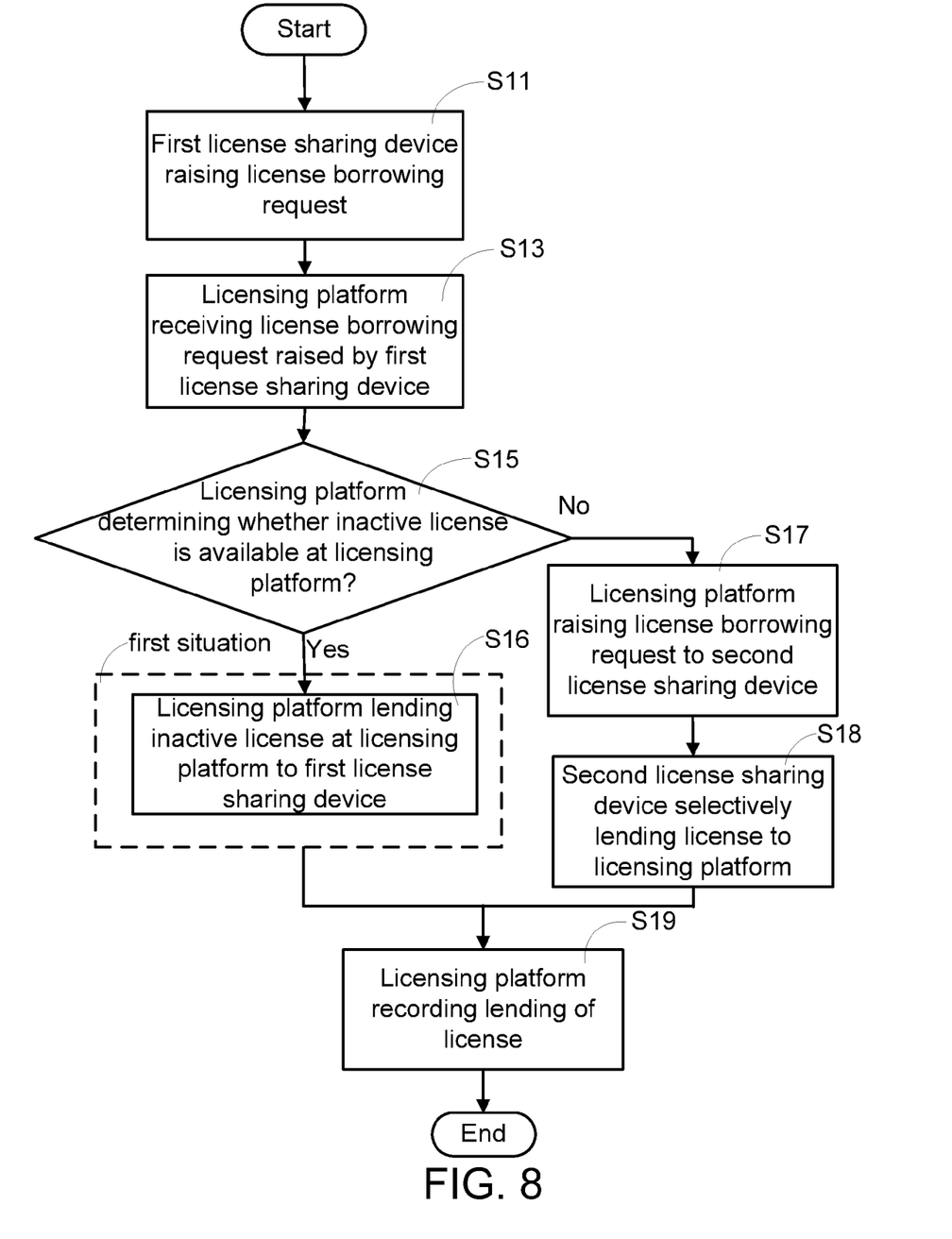
FIG. 8 is a flowchart of a license management method of the present invention.
Figure 9:
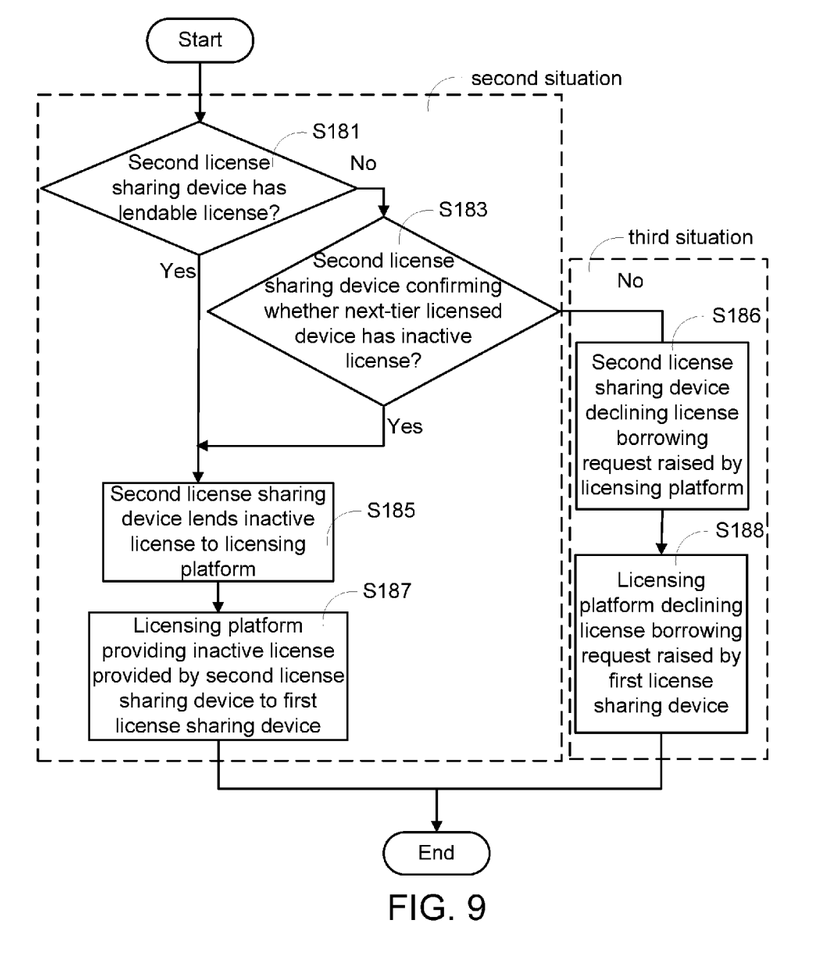
FIG. 9 shows details of step S18 in FIG. 8.

To better illustrate determination bases that the licensing platform dynamically allocates the software licenses, a determination process of the licensing system is described with FIGS. 8 and 9 in continuation of the foregoing example. FIG. 8 shows a flowchart of a license management method of the present invention. In step S11, the first license sharing device 51 raises the licensing borrowing request when the license borrowing condition is established. In step S13, the licensing platform 50 receives the license borrowing request raised by the first license sharing device 51.

In continuation of the example in FIG. 4, the first license sharing device 51 raises the license borrowing request for 5 additional licenses. It should be noted that, details how the first license sharing device 51 determines whether the license borrowing condition is established and determination bases of the license borrowing condition can be defined internally by the first license sharing device 51. For example, when the number of licenses actually utilized in the first license sharing device 51 reaches 35, the license borrowing condition is considered as established. Alternatively, when the number of licenses actually utilized in the first license sharing device 51 reaches 95%, the license borrowing condition is considered as established. In step S15, the licensing platform 50 determines whether it has inactive software licenses.

Assume that out of 10 software licenses allocated to the licensing platform 50, 5 or more software licenses are not in use. In step S16, the license lending condition is established, and the licensing platform 50 lends the inactive software licenses at the licensing platform 50 to the first license sharing device 51 to use. This step corresponds to the first situation described in the third row of FIG. 4, and FIGS. 7A and 7B.

In step S17, when the number of lendable licenses of the licensing platform 50 is insufficient, the licensing platform 50 raises another license borrowing request to the second license sharing device 53. In step S18, the second license sharing device 53 selectively lends software licenses to the licensing platform 50. In step S19, in response to the license lending of the licensing platform 50, a record is correspondingly generated. The record may include information of whether origin of the software license being lent is the second license sharing device 53 or the licensing platform 50, and whether the license withdrawal condition is accompanied when the second license sharing device 53 or the licensing platform 50 lends the licenses. For example, the license withdrawal condition may be a period that the second license sharing device 53 or the licensing platform 50 agrees to lend the software licenses. Alternatively, the license withdrawal condition may be that, when the number of licenses of the second license sharing device 53 or the licensing platform 50 that having lent the licenses increases to a predetermined number, the lent licenses borrowed by the first license sharing device 51 are to be first withdrawn.

FIG. 9 further shows details of step S18 in FIG. 8. In step S181, the second license sharing device 53 determines whether it has lendable licenses.

As one example of an established license lending condition, in step S185, when the second license sharing device 53 has 5 (or more) inactive software licenses, the second license sharing device 53 directly sends 5 inactive software licenses to the licensing platform 50. In step S183, when the second license sharing device 53 does not have 5 inactive software licenses, the second license sharing device 53 further confirms whether a next-tier licensed device (a license sharing device or a license usage device) has inactive software licenses.

As another example of an established license lending condition, it is assumed that the second license sharing device learns that there are 5 inactive software licenses through inquiring the next-tier licensed device. In step S185, the second license sharing device 53 lends the 5 licenses to the licensing platform 50.

In practice, other circumstances may be considered. For example, it is possible that the number of available licenses that the second license sharing device 53 obtains from the next-tier licensed device is less than 5, and thus the second license sharing device 53 provides only the available number of licenses to the licensing platform 50. Further, although the next-tier licensed device of the second license sharing device 53 currently has 5 software licenses available, the second license sharing device 53 may still refuse to lend the licenses to the licensing platform 50 if it is expected that the 5 software licenses need to be used soon (e.g., in 10 minutes). In other words, the second license sharing device 53 and the next-tier licensed device may define license lending conditions for lending inactive software licenses. Further, the licensing platform 50 is also required to record the license lending conditions when dynamically allocating the software licenses being lent. It should be noted that, in step S185, the second license sharing device 53 may send associated conditions for lending licenses to the licensing platform 50, so as to ensure that the lent licenses can be immediately retrieved in the event that the second license sharing device 53 or its next-tier licensed devices need to later utilize the licenses. In step S187, the licensing platform 50 further provides the licenses lent by the second license sharing device 53 to the first license sharing device 51 to use.

The above steps S181, S183, S185 and S187 are corresponding to the second situation described in the fourth row of FIG. 4, and FIGS. 6A and 6B. On the other hand, in step S186, when the determination result of step S183 is negative, the second license sharing device 53 declines the license borrowing request raised by the licensing platform 50. In step S188, the licensing platform 50 declines the license borrowing request raised by the first license sharing device 51. The above steps S181, S183, S186 and S188 are corresponding to the third situation described in the fifth row of FIG. 4, and FIGS. 7A and 7B.

In conclusion, when the first license sharing device 51 raises the license borrowing request, the licensing platform 50 determines how to dynamically borrow/lend the software licenses. The licensing platform 50 directly provides the software licenses to the first license sharing device 51 when the licensing platform 50 has inactive software licenses that can be lent. Else, the licensing platform 50 passes the license borrowing request to next-tier licensed devices.

When the second license sharing device 53 obtains the license borrowing request from the licensing platform 50, the second license sharing device 53 similarly first confirms whether the second license sharing device 53 itself has available licenses. The second license sharing device 53 directly provides the software licenses to the licensing platform 50 when the second license sharing device 53 has inactive software licenses. Else, the second license sharing device 53 also passes the license borrowing request to a next-tier licensed device. The second license sharing device 53, after obtaining the inactive software licenses, from itself or from a next-tier licensed device, sends the inactive software licenses to the licensing platform 50. The licensing platform 50 then passes the software licenses lent by the second license sharing device 51 to the first license sharing device 51.

In other words, for a tier-one license sharing device, operations of raising a license borrowing request, lending licenses and withdrawing licenses are all performed through the licensing platform. The above management method for license borrowing requests, license lending and licenses withdrawal through the licensing platform 50 may also be applied to license sharing devices of lower tiers. For example, a next-tier licensed device of the second license sharing device 53 manages license borrowing requests, license lending and licenses withdrawal through the second license sharing device 53. As such, inactive software licenses of licensed devices of different tiers may be acquired through iterated means, so as to eliminate a situation where a certain users cannot obtain licenses for performing operations and registrations while other licensed devices may have inactive software licenses.

In further applications, a determination of sharing may be further based on a usage status of license sharing devices. Some examples are given below for describing some of the diversified further applications. It should be noted that the present invention is not limited to the following examples.

In a first further application, for example, when the license borrowing condition is established for the license sharing device, a license borrowing request is immediately generated. As such, a window/blank period in the usage of licenses can be prevented. For example, the license sharing device constantly detects a usage status and in advance raises a request for utilizing the software licenses. For example, for the first license sharing device, the number of software licenses required by next-tier licensed devices may be gradually increasing. Thus, a threshold of a license usage number may be set by the first license sharing device. For example, the license borrowing condition is considered as established when the number of software licenses utilized by the first license sharing device reaches 35.

According to system requirements, the threshold set by the license sharing device may be a predetermined number or a predetermined percentage. Further, the licensing platform may adopt different thresholds for different license sharing devices and different software. For example, for the first license sharing device, the threshold for software A is set to 35, and the threshold for software B is set to 20. Alternatively, for the second license sharing device, the threshold for software A is set to 80%, and the threshold for software B is set to 90%. Details for setting the thresholds can be easily defined and implemented by a person having ordinary skill in the art, and shall be omitted herein.

In a second further application, for example, the license sharing device also sets a future license withdrawal condition when lending licenses. For example, assume that when the second license sharing device agrees to share/lend its software licenses, it also learns in advance that a next-tier license sharing device or a next-tier license usage device will need 20 software licenses in one hour. At this point, when lending licenses, the second license sharing device may set the software licenses to be lent for one hour through setting a license withdrawal condition. After one hour, the licensing platform shall return 5 software licenses to the second license sharing device with priority. In the event that the first license sharing device no longer needs to utilize the software licenses after one hour, no license conflict is incurred. However, when the first license sharing device still needs to utilize the software licenses borrowed from the second license sharing device, the licensing platform shall again confirm the usage status of 10 license usage devices in communication with the licensing platform. The licensing platform then provides 5 software licenses to the second license sharing device if only 5 of the license usage devices are utilizing the software licenses. However, if the license usage status indicates that the 10 license usage devices are still utilizing the software licenses, the first license sharing device is nonetheless required to return the 5 software licenses lent by the second license sharing device.

Alternatively, assume that the license usage status indicates that the 10 license usage devices in communication with the licensing platform are still utilizing/occupying the software licenses. It is further assumed that an allocation principle of the licensing platform is that the first license sharing device has a higher priority for licenses access than license usage devices. At this point, the licensing platform suspends 5 out of the 10 license usage devices and terminates their usage of the software licenses. The licensing platform further provides the 5 software licenses retrieved from the license usage devices to the second license sharing device. In another application, the number of license usage devices in communication with the licensing platform may be much more than the above example. Thus, the licensing platform may also dynamically allocate the software licenses of other license sharing devices.

In a third further application, for example, the license sharing device may provide a pre-sharing mechanism for accelerating speed of license-sharing. For example, when the second license sharing device has inactive software licenses in a number greater than a predetermined number, the second license sharing device initiatively provides some/all of the inactive software licenses to the licensing platform. For example, assuming that the second license sharing device is allocated with 40 software licenses, 10 remaining licenses may be utilized by the group of the second license sharing device when the second license sharing device utilizes only 30 software licenses. However, when the number of software licenses utilized by the second license sharing device is less than 20, the second license sharing device initiatively provides 10 licenses to the licensing platform. Thus, in the event that the first license sharing device raises a license borrowing request for 5 additional licenses, the licensing platform can immediately provides the software licenses to the first license sharing device. By reducing the requirement of search through next-tier license sharing devices, the speed that the first license sharing device acquires the software licenses is accelerated.

In a fourth further application, for example, when the licensing platform is implemented jointly with multiple license sharing devices, the licensing platform compares license usage statuses corresponding to the remaining license sharing devices if one of the license sharing devices raises the license usage request. For example, when the first license sharing device raises the license borrowing request, the respective license usage statuses corresponding to the second license sharing device and the third license sharing device are compared. Assuming that the second license sharing device has 10 available licenses and the third license sharing device has 30 available licenses, the software licenses are first borrowed from the third license sharing device.

In addition to allocating the software licenses among license sharing devices through the licensing platform, license sharing devices of the present invention may also allocate software licenses for next-tier license sharing devices and license usage devices. That is to say, the foregoing license sharing approach through the licensing platform may also be applied to the first license sharing device 51 and the second license sharing device 53. As previously described, the next tier of the first license sharing device 51 may further include two license sharing devices. The two license sharing devices may also borrow/lend software licenses from/to each other or share software licenses with each other.

The license sharing devices of the present invention, apart from operations in response to a license borrowing request raised by a next-tier license sharing device, may also provide other types of operations. Details of a license sharing device controlling internal managers in response to different situations are to be described with reference to the accompanying drawings below. In the diagrams below, operation sequences are represented by numerical denotations, and operation directions are represented by arrows.

Details of the license sharing device in response to other types of operations are illustrated with reference to FIGS. 10, 11 and 12. To clearly depict a process, no connections are marked among the managers in the diagrams.

Figure 10:
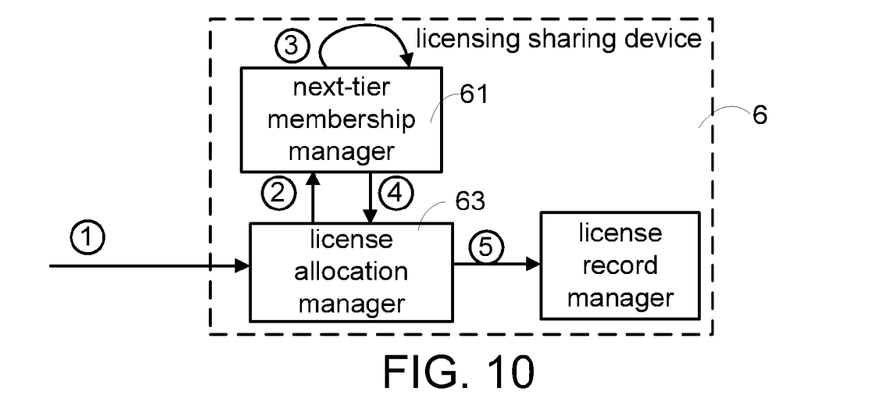
FIG. 10 is a schematic diagram of an allocation status of the license sharing device.

FIG. 10 shows a schematic diagram of a license sharing device of the present invention in a license allocating status. Number 1: a license allocation manager 63 obtains software licenses allocated from a previous tier. Number 2: the license allocation manager 63 informs a next-tier license sharing device (not shown) of the number of software licenses being allocated and obtained. Number 3: a next-tier membership manager 61 allocates the software licenses to next-tier licensed devices (not shown), and confirms the number of the next-tier licensed devices and respective numbers of software licenses allocated to these next-tier licensed devices. Number 4: the next-tier membership manager 61 reports the number of software licenses being allocated and obtained and the numbers of software licenses respectively allocated to the next-tier licensed devices (not shown) to the license allocation manager 63. Number 5: the license allocation manager 63 provides the license allocation status provided by the next-tier membership manager 63 to the license record manager 65. In practice, a previous-tier license sharing device (not shown) may dynamically inquire the license usage status of the license sharing device 6.

Figure 11:
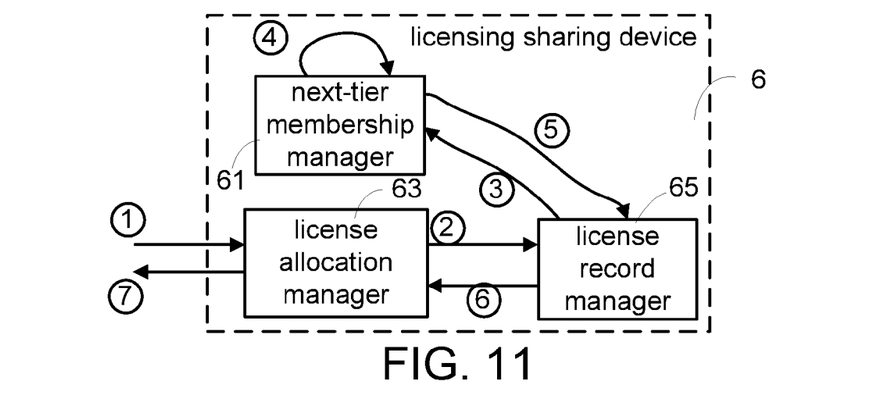
FIG. 11 is a schematic diagram of the license sharing device in an inquiry status.

FIG. 11 shows a schematic diagram of the license sharing device of the present invention in the license inquiry status. Number 1: a previous-tier license sharing device (not shown) sends an inquiry request for the license usage status to the license allocation manager 63 of the license sharing device. Number 2: the license allocation manager 63 sends the inquiry request to the license record manager 65. Number 3: if the license record manager 63 is registered with next-tier licensed devices of the license sharing device, the license record manager 63 sends a request for updating the license usage status to the next-tier membership manager 61. Number 4: the next-tier membership manager 61 inquires the license sharing device to update the license usage status. Number 5: the next-tier membership manager 61 sends the latest license usage status to the license record manager 65 to further update the internal record of the license record manager 65. Number 6: the license record manager 65 consolidates the license sharing device 6, and sends the license usage status of the next-tier licensed devices reported from the next-tier membership manager 61 to the license allocation manager 63. Number 7: the license allocation manager 63 replies the license usage status to the previous-tier license sharing device (not shown).

Figure 12:
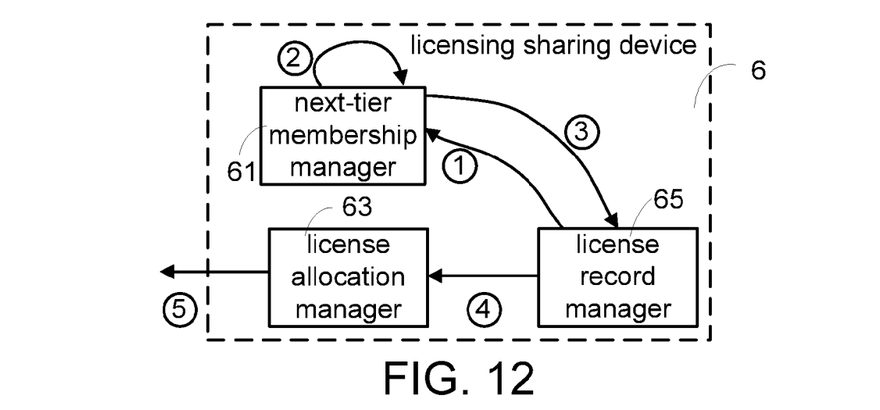
FIG. 12 is a schematic diagram of the license sharing device in an updating status.

FIG. 12 shows a schematic diagram of a license sharing device of the present invention in a license updating status. Number 1: when the license record manager 63 wishes to inquire for the license usage status corresponding to the next-tier licensed devices (not shown) of the license sharing device 6, the license record manager 63 sends a request for updating the license usage status to the next-tier membership manager 61. Number 2: the next-tier membership manager 61 inquires the next-tier license sharing device (not shown) to update the license usage status. Number 3: the next-tier membership manager 61 sends the latest license usage status to the license record manager 65 to further update the record in the license record manager 65. Number 4: the license record manager 63 consolidates the license usage statuses of the license sharing device 6 and that of the next-tier licensed devices reported by the next-tier membership manager 61. Then the license record manager 63 sends the consolidated license usage statuses to the license allocation manager 63. Number 5: the license allocation manager 63 sends the updated license usage status to a previous-tier license sharing device.

Apart from receiving the license borrowing request sent from a previous tier, a license sharing device is also required to allocate licenses in response to the license borrowing request sent from a next tier. Details of the license sharing device respectively obtaining licenses within the group and from a previous-tier license sharing device in response to a license borrowing request raised by a next-tier licensed device are given with reference to FIGS. 13A, 13B and 13C. The licensed device raising the license borrowing request may be a license usage device or a license sharing device. To clearly depict a process, no connections are marked among the managers in the diagrams.

Figure 13A:
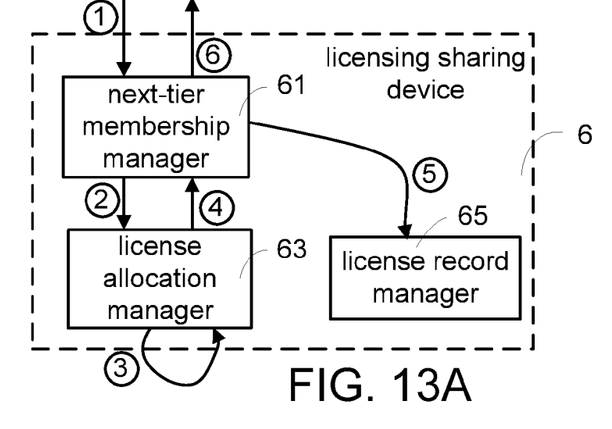
FIG. 13A is a schematic diagram of the license sharing device directly lending a software license.

FIG. 13A shows a schematic diagram of a license sharing device of the present invention directly lending a license in response to a license borrowing request raised by a next-tier license sharing device. Number 1: the next-tier membership manager 61 receives a license borrowing request from a next-tier licensed device (not shown). Number 2: the next-tier membership manager 61 sends the license borrowing request to the license allocation manager 63. Number 3: the license allocation manager 63 determines whether it can provide inactive software licenses for lending. Number 4: the license allocation manager 63 determines that it can provide inactive software licenses by itself, and determines to provide the software license to the next-tier licensed device (not shown) raising the license borrowing request. The license allocation manager 63 sends the software license to the next-tier membership manager 61. Number 5: the allocation decision is provided to the license record manager 65, which records the allocation record of the software license. The usage record includes information such as the licensed device raising the license borrowing request, a starting time of borrowing the software license, and an ending time of returning the software license etc. Number 6: the next-tier membership manager 61 sends the software license to the next-tier licensed device (not shown) raising the license borrowing request.

Figure 13B:
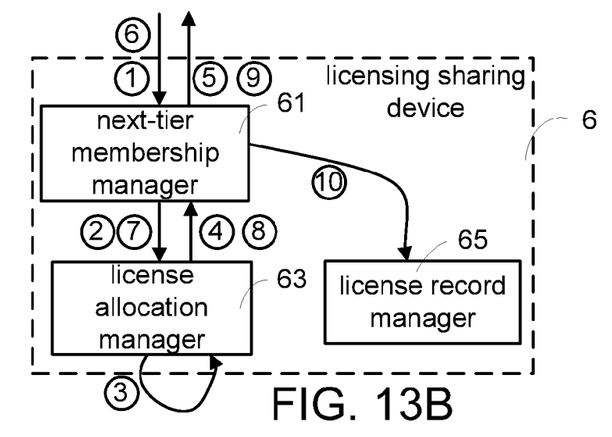
FIG. 13B is a schematic diagram of the license sharing device lending a license.

FIG. 13B shows a schematic diagram of a license sharing device lending a license through another next-tier license sharing device in response to a license borrowing request raised by a next-tier license sharing device. Number 1: the next-tier member manager 61 receives a license borrowing request raised by a next-tier licensed device (not shown). Number 2: the next-tier membership manager 61 sends the license borrowing request to the license allocation manager 63. Number 3: the license allocation manager 63 determines whether it has an inactive software license. Number 4: the license allocation manager 63 determines that it does not have an inactive software license, and thus informs the next-tier membership manager 61. Number 5: the next-tier membership manager 61 is informed to inquire the next-tier licensed device whether other next-tier licensed devices (not shown) have lendable licenses. Number 6: the inquired next-tier licensed device replies the next-tier membership manager 61 that an inactive software license is available. Number 7: the next-tier membership manager 61 informs the license allocation manager 63 that the inquired next-tier licensed device has an inactive software license. Number 8: the license allocation manager 63 allocates the inactive software license obtained from inquired next-tier licensed device to the next-tier licensed device (not shown) raising the license borrowing request. The license allocation manager 63 sends the lendable license through the next-tier membership manager 63. Number 9: the next-tier membership manager 61 sends the software license allocated by the license allocation manager 63 to the next-tier licensed device (not shown) raising the license borrowing request. Number 10: the license allocation manager 63 provides information associated with the licensed device borrowing the software license to the license record manager 65. The license record manager 65 updates the corresponding license usage status of the license sharing device 6 that borrows the license and an internal usage status of the software licenses.

Figure 13C:
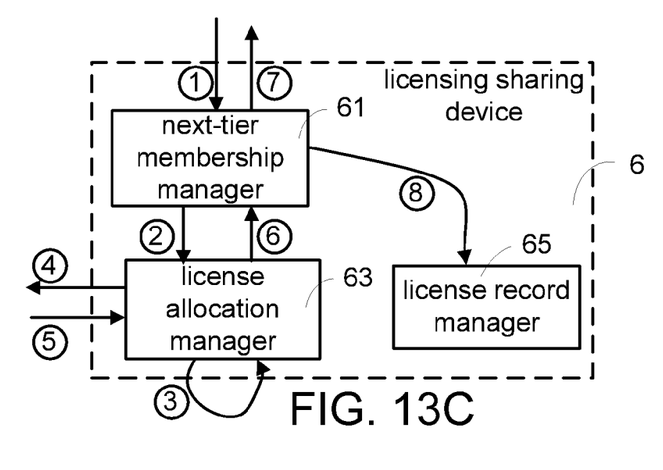
FIG. 13C is a schematic diagram of the license sharing device borrowing software licenses.

FIG. 13C shows a schematic diagram of a license sharing device of the present invention borrowing a license through a previous-tier license sharing device in response to a license borrowing request raised by a next-tier license sharing device. Number 1: the next-tier membership manager 61 receives a license borrowing request raised by a next-tier licensed device. Number 2: the next-tier membership manager 61 sends the license borrowing request to the license allocation manager 63. Number 3: the license allocation manager 63 determines whether it has an inactive software license available. Number 4: the license allocation manager 63 determines that it does not have any inactive software license, and thus raises a license borrowing request to a previous-tier license sharing device. Number 5: the license allocation manager 63 obtains software licenses borrowed from the previous-tier license sharing device. Number 6: the license allocation manager 63 sends the borrowed software license through the next-tier membership manager 61. Number 7: the next-tier membership manager 61 sends the software licenses allocated by the license allocation manager 63 to the next-tier licensed device raising the license borrowing request. Number 8: the license allocation manager 63 provides information associated with the licensed device borrowing the license to the license record manager 65. The license record manager 65 updates the corresponding license usage status of the license sharing device 6 that borrows the license and an internal usage status of the software licenses.

Therefore, the licensing system provided by the present invention offers a flexible license management function and significantly increases usage efficiency of software.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A licensing platform, in communication with a first license sharing device and a second license sharing device, comprising:
   a license database, for providing a plurality of licenses; and
   a main license sharing device, comprising:

a license allocation manager, in communication with the license database, for dynamically managing a usage status of the plurality of licenses;

a next-tier membership manager, in communication with the license sharing devices, for allocating at least one of the plurality of licenses to the license sharing devices, and updating the license usage status of the plurality of licenses corresponding to the first and the second license sharing devices; and a license record manager, in communication with the license allocation manager and the next-tier membership manager, for recording the usage status of the plurality of licenses;

wherein the next-tier membership manager sends a license borrowing request to the license allocation manager after receiving the license borrowing request from the first license sharing device, and when the usage status of the plurality of licenses recorded by the license record manager indicates that the a number of inactive software licenses is greater than or equal to a number of licenses required by the license borrowing request, the license allocation manager provides the licenses required by the license borrowing request to the first license sharing device through the next-tier membership manager.

2. The licensing platform according to claim 1, wherein the license database obtains the plurality of licenses from a software license provider.

3. The licensing platform according to claim 1, wherein the license record manager records the usage status of the plurality of licenses by recording a log-in account of a user, a license sharing device operated by the user, and a starting time and an ending time of the plurality of licenses utilized by the user through the license sharing devices.

4. The licensing platform according to claim 1, wherein the first license sharing device generates the license borrowing request when a borrowing condition is established.

5. A licensing platform, in communication with a first license sharing device and a second license sharing device, comprising:

a license database, for providing a plurality of licenses; and a main license sharing device, comprising:

a license allocation manager, in communication with the license database, for dynamically managing a usage status of the plurality of licenses;

a next-tier membership manager, in communication with the license sharing devices, for allocating at least one of the plurality of licenses to the license sharing devices, and updating the license usage status of the plurality of licenses corresponding to the first and the second license sharing devices; and a license record manager, in communication with the license allocation manager and the next-tier membership manager, for recording the usage status of the plurality of licenses;

wherein the next-tier membership manager sends a license borrowing request to the license allocation manager after receiving the license borrowing request from the first license sharing device, and when the usage status of the plurality licenses recorded by the license record manager indicates that the a number of inactive software licenses is less than a number of licenses required by the license borrowing request, the license allocation manager sends the license borrowing request to the second license sharing device through the next-tier membership manager.

6. The licensing platform according to claim 5, wherein the license database obtains the plurality of licenses from a software license provider.

7. The licensing platform according to claim 5, wherein the license record manager records the usage status of the plurality of licenses by recording a log-in account of a user, a license sharing device operated by the user, and a starting time and an ending time of the plurality of licenses utilized by the user through the license sharing devices.

8. The licensing platform according to claim 5, wherein the first license sharing device generates the license borrowing request when a borrowing condition is established.

9. The licensing platform according to claim 5, wherein the second license sharing device selectively provides the allocated licenses to the license allocation manager through the next-tier membership manager.

10. The licensing platform according to claim 9, wherein when a lending condition is established, the second license sharing device provides the allocated licenses to the license allocation manager through the next-tier membership manager.

11. The licensing platform according to claim 9, wherein when the second license sharing device provides the allocated licenses to the license allocation manager through the next-tier membership manager, the second license sharing device further provides a withdrawal condition to the license allocation manager through the next-tier membership manager.

* * * * *